(12) United States Patent
Madnani et al.

(10) Patent No.: US 8,612,680 B1
(45) Date of Patent: Dec. 17, 2013

(54) DATA CACHING SYSTEM AND METHOD

(75) Inventors: Kiran Madnani, Framingham, MA (US); Randall H. Shain, Wrentham, MA (US); David W. DesRoches, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 793 days.

(21) Appl. No.: 12/828,111

(22) Filed: Jun. 30, 2010

(51) Int. Cl.
*G06F 13/10* (2006.01)
(52) U.S. Cl.
USPC ............ 711/114; 711/113; 711/118; 714/6.1; 714/6.23
(58) Field of Classification Search
USPC .................... 711/114, 113, 118; 714/6.1, 6.23
See application file for complete search history.

(56) References Cited

U.S. PATENT DOCUMENTS

| | | | | |
|---|---|---|---|---|
| 6,148,430 | A * | 11/2000 | Weng | 714/770 |
| 8,037,391 | B1 * | 10/2011 | Jung et al. | 714/759 |
| 8,150,031 | B2 * | 4/2012 | Gueron | 380/28 |
| 8,296,515 | B1 * | 10/2012 | Saxena et al. | 711/114 |
| 2005/0229023 | A1 * | 10/2005 | Lubbers et al. | 714/4 |
| 2006/0123269 | A1 * | 6/2006 | Forhan et al. | 714/6 |

* cited by examiner

*Primary Examiner* — Jae Yu
(74) *Attorney, Agent, or Firm* — Brian J. Colandreo; Mark H. Whittenberger; Holland & Knight LLP

(57) ABSTRACT

A system, computer program product, and computer-implemented method for defining a data stripe that spans one or more of N data storage devices and one or more of M erasure code devices. The one or more N data storage devices and the one or more M erasure code devices are included within a data storage system. A data chunk to be written to the data storage system is received. At least a portion of the data chunk is written to the portion of the data stripe that spans the one or more N data storage devices. Each of the N data storage devices and the M erasure code devices is included within a unique server computer.

18 Claims, 4 Drawing Sheets

DATA CACHING SYSTEM AND METHOD

TECHNICAL FIELD

This disclosure relates to data systems and, more particularly, to data caching systems.

BACKGROUND

Data durability is of paramount importance at an enterprise level, as device failure may result in the loss of data. Accordingly, if a reliable data storage system is not utilized, permanent data loss may result.

While various types of data arrays may be utilized to protect data stored within a centralized data repository, data is often cached within internal memory devices located within separate and discrete computing devices. Often, this data cached within these internal memory devices may be unprotected and, therefore, a device failure may result in permanent (i.e., non-recoverable) data loss.

SUMMARY OF DISCLOSURE

In one implementation, a data caching system includes a data storage system including N data storage devices and M erasure code devices, at least one processor, and at least one memory architecture coupled with the at least one processor. A first software module is executed on the at least one processor and the at least one memory architecture. The first software module is configured to perform operations including defining a data stripe that spans one or more of the N data storage devices and one or more of the M erasure code devices. A second software module is executed on the at least one processor and the at least one memory architecture. The second software module is configured to perform operations including receiving a data chunk to be written to the data storage system. A third software module is executed on the at least one processor and the at least one memory architecture. The third software module is configured to perform operations including writing at least a portion of the data chunk to the portion of the data stripe that spans the one or more N data storage devices. Each of the N data storage devices and the M erasure code devices is included within a unique server computer.

One or more of the following features may be included. The data stripe may span all of the N data storage devices. Writing at least a portion of the data chunk to the portion of the data stripe that spans the one or more N data storage devices may include writing at least a portion of the data chunk to the portion of the data stripe that spans all of the N data storage devices. The data stripe may span one of the N data storage devices. Writing at least a portion of the data chunk to the portion of the data stripe that spans the one or more N data storage devices may include writing at least a portion of the data chunk to the portion of the data stripe that spans one of the N data storage devices.

Erasure code data may be generated based, at least in part, upon the data chunk to be written to the data storage system. At least a portion of the erasure code data may be written to the portion of the data stripe that spans the one or more M erasure code devices. The erasure code data may include parity data.

The data chunk received may be larger in size than the capacity of the data stripe. Defining a data stripe that spans one or more of the N data storage devices and one or more of the M erasure code devices may include defining a plurality of data stripes that each span one or more of the N data storage devices and one or more of the M erasure code devices. Writing at least a portion of the data chunk to the portion of the data stripe that spans the one or more N data storage devices may include writing at least a portion of the data chunk to the portion of each of the plurality of data stripes that spans the one or more N data storage devices.

At least a portion of the data chunk may be temporarily stored in a high availability fashion prior to writing at least a portion of the data chunk to the portion of the data stripe that spans the one or more N data storage devices.

In another implementation, a computer program product resides on a computer readable medium having a plurality of instructions stored on it. When executed by a processor, the instructions cause the processor to perform operations including defining a data stripe that spans one or more N data storage devices and one or more M erasure code devices. The one or more N data storage devices and the one or more M erasure code devices are included within a data storage system. A data chunk to be written to the data storage system is received. At least a portion of the data chunk is written to the portion of the data stripe that spans the one or more N data storage devices. Each of the N data storage devices and the M erasure code devices is included within a unique server computer.

One or more of the following features may be included. The data stripe may span all of the N data storage devices. Writing at least a portion of the data chunk to the portion of the data stripe that spans the one or more N data storage devices may include writing at least a portion of the data chunk to the portion of the data stripe that spans all of the N data storage devices. The data stripe may span one of the N data storage devices. Writing at least a portion of the data chunk to the portion of the data stripe that spans the one or more N data storage devices may include writing at least a portion of the data chunk to the portion of the data stripe that spans one of the N data storage devices.

Erasure code data may be generated based, at least in part, upon the data chunk to be written to the data storage system. At least a portion of the erasure code data may be written to the portion of the data stripe that spans the one or more M erasure code devices. The erasure code data may include parity data.

The data chunk received may be larger in size than the capacity of the data stripe. Defining a data stripe that spans one or more of the N data storage devices and one or more of the M erasure code devices may include defining a plurality of data stripes that each span one or more of the N data storage devices and one or more of the M erasure code devices. Writing at least a portion of the data chunk to the portion of the data stripe that spans the one or more N data storage devices may include writing at least a portion of the data chunk to the portion of each of the plurality of data stripes that spans the one or more N data storage devices.

At least a portion of the data chunk may be temporarily stored in a high availability fashion prior to writing at least a portion of the data chunk to the portion of the data stripe that spans the one or more N data storage devices.

In another implementation, a computer-implemented method includes defining a data stripe that spans one or more of N data storage devices and one or more of M erasure code devices. The one or more N data storage devices and the one or more M erasure code devices are included within a data storage system. A data chunk to be written to the data storage system is received. At least a portion of the data chunk is written to the portion of the data stripe that spans the one or more N data storage devices. Each of the N data storage devices and the M erasure code devices is included within a unique server computer.

One or more of the following features may be included. The data stripe may span all of the N data storage devices. Writing at least a portion of the data chunk to the portion of the data stripe that spans the one or more N data storage devices may include writing at least a portion of the data chunk to the portion of the data stripe that spans all of the N data storage devices. The data stripe may span one of the N data storage devices. Writing at least a portion of the data chunk to the portion of the data stripe that spans the one or more N data storage devices may include writing at least a portion of the data chunk to the portion of the data stripe that spans one of the N data storage devices.

Erasure code data may be generated based, at least in part, upon the data chunk to be written to the data storage system. At least a portion of the erasure code data may be written to the portion of the data stripe that spans the one or more M erasure code devices. The erasure code data may include parity data.

The data chunk received may be larger in size than the capacity of the data stripe. Defining a data stripe that spans one or more of the N data storage devices and one or more of the M erasure code devices may include defining a plurality of data stripes that each span one or more of the N data storage devices and one or more of the M erasure code devices. Writing at least a portion of the data chunk to the portion of the data stripe that spans the one or more N data storage devices may include writing at least a portion of the data chunk to the portion of each of the plurality of data stripes that spans the one or more N data storage devices.

At least a portion of the data chunk may be temporarily stored in a high availability fashion prior to writing at least a portion of the data chunk to the portion of the data stripe that spans the one or more N data storage devices.

The details of one or more implementations are set forth in the accompanying figures and the description below. Other features and advantages will become apparent from the description, the figures, and the claims.

BRIEF DESCRIPTION OF THE FIGURES

Like reference symbols in the various figures indicate like elements.

DETAILED DESCRIPTION OF THE PREFERRED EMBODIMENTS

Figure 1:
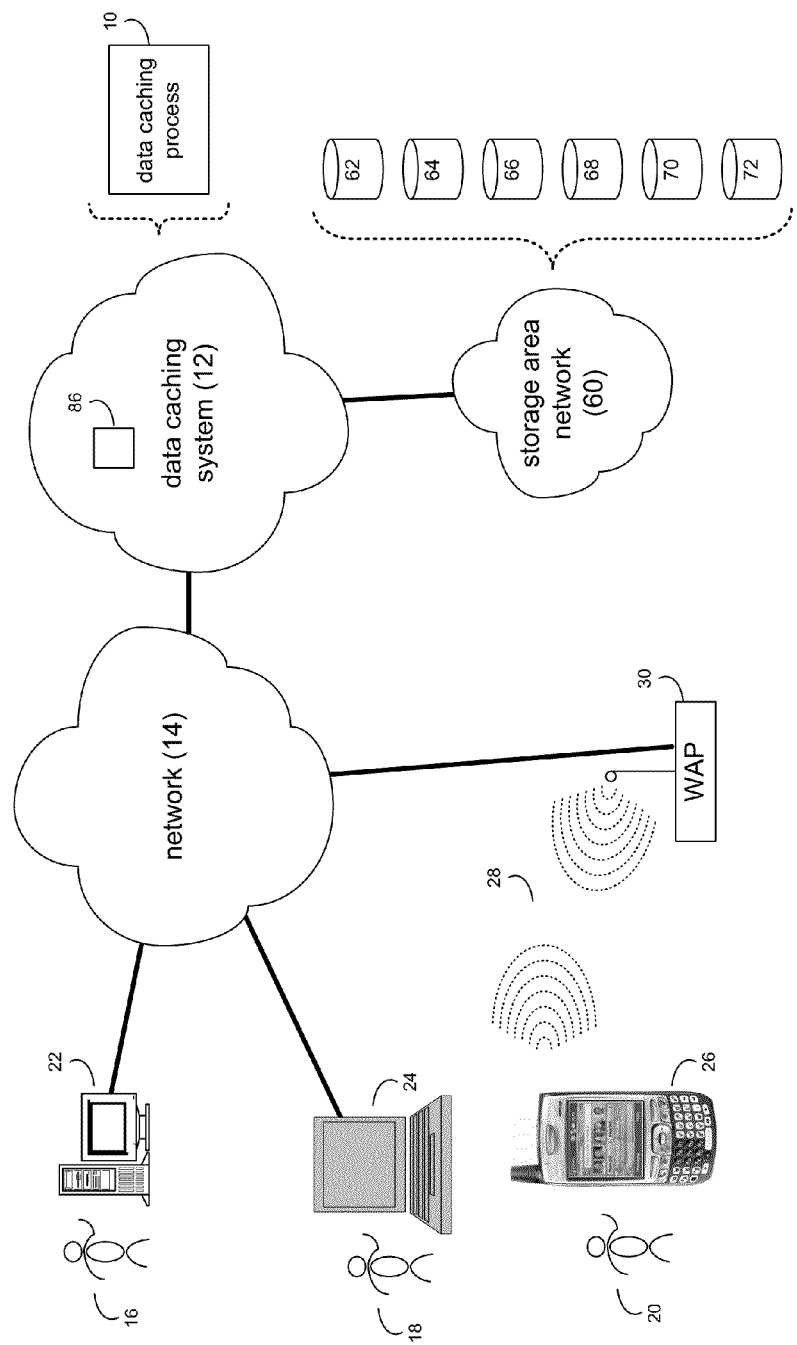
FIG. 1 is a diagrammatic view of a data caching system coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
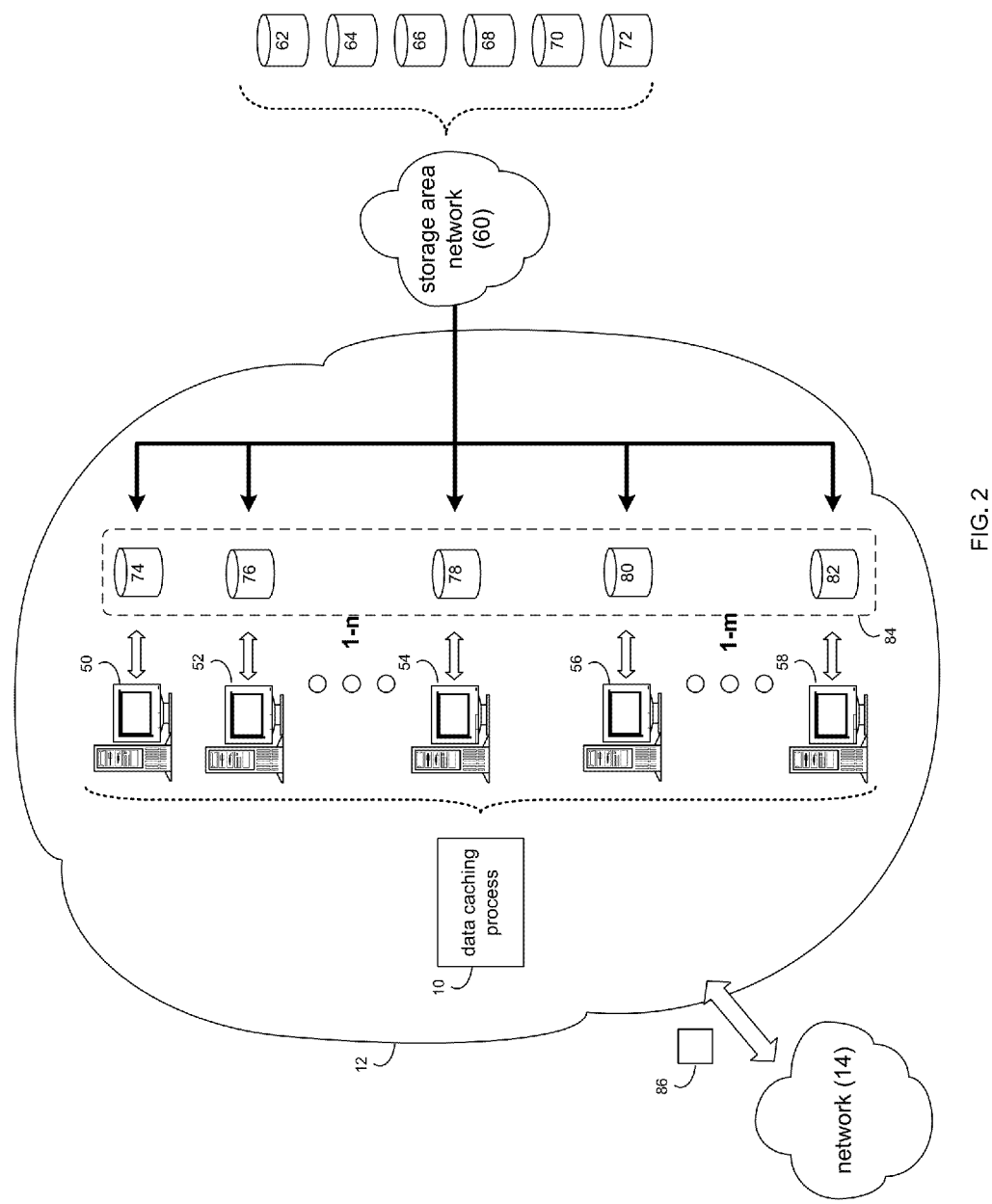
FIG. 2 is a diagrammatic view of the data caching system of FIG. 1.

System Overview:

Referring to FIGS. 1 & 2, there is shown data caching process 10 that may reside on and may be executed by data caching system 12, which may be connected to network 14 (e.g., the Internet or a local area network). Examples of data caching system 12 may include, but are not limited to any combination of computing devices and storage devices. One exemplary embodiment includes five server computers 50, 52, 54, 56, 58, configured to work as a caching tier. Server computers 50, 52, 54, 56, 58 may be configured as discrete computing devices within data caching system 12.

Data caching system 12 may be coupled to a storage area network (e.g., storage area network 60) or any other form of persistent storage. Storage area network 60 may include/be coupled to one or more storage devices (e.g., storage devices 62, 64, 66, 68, 70. 72, which may be configured to act as persistent storage for data initially cached within server computers 50, 52, 54, 56, 58.

Each of server computers 50, 52, 54, 56, 58 may include a storage device (e.g., storage devices 74, 76, 78, 80, 82 respectively), examples of which may include but are not limited to solid-state memory devices, such as random access memory (RAM) devices and flash-based memory devices (e.g., a flash drive). These storage devices (e.g., storage devices 74, 76, 78, 80, 82) may form data storage system 84 (within data caching system 12) for temporarily caching data received for storage on storage area network 60. Storage devices 74, 76, 78, 80, 82 may be configured as N data storage devices and M erasure code devices. For illustrative purposes, assume that N is equal to three and storage devices 74, 76, 78 are configured as data storage devices. Further and for illustrative purposes, assume that M is equal to two and storage devices 80, 82 are configured as erasure code devices.

One or more of the servers (e.g., server computers 50, 52, 54, 56, 58) included within data caching system 12 may be a web server (or a series of servers) running a network operating system, examples of which may include but are not limited to: Microsoft Windows XP Server™; Novell Netware™; or Redhat Linux™, for example. Server computers 50, 52, 54, 56, 58 may execute a web server application, examples of which may include but are not limited to: IBM WebSphere™, Microsoft IIS™, Novell Webserver™, or Apache Webserver™, that allows for HTTP (i.e., HyperText Transfer Protocol) access to one or more of server computer 50, 52, 54, 56, 58 via network 14. Network 14 may be connected to one or more secondary networks (not shown), examples of which may include but are not limited to: a local area network; a wide area network; or an intranet, for example.

Figure 3:
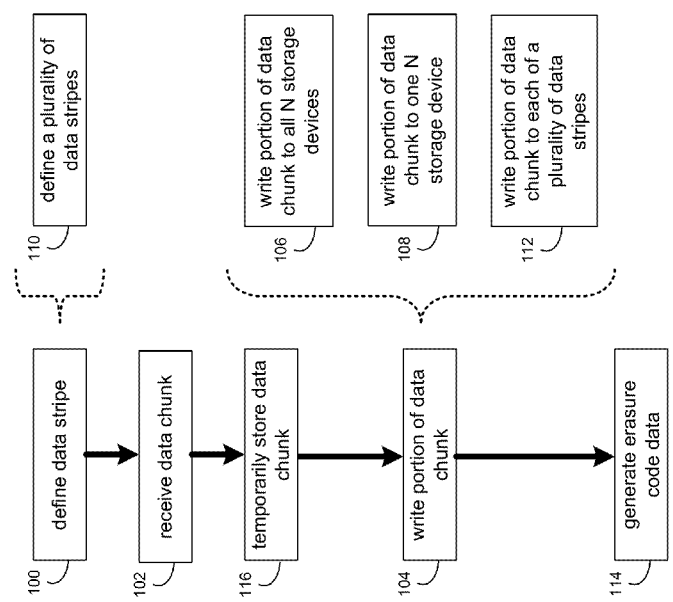
FIG. 3 is a flowchart of a data caching process executed by the data caching system of FIG. 1.
Figure 4:
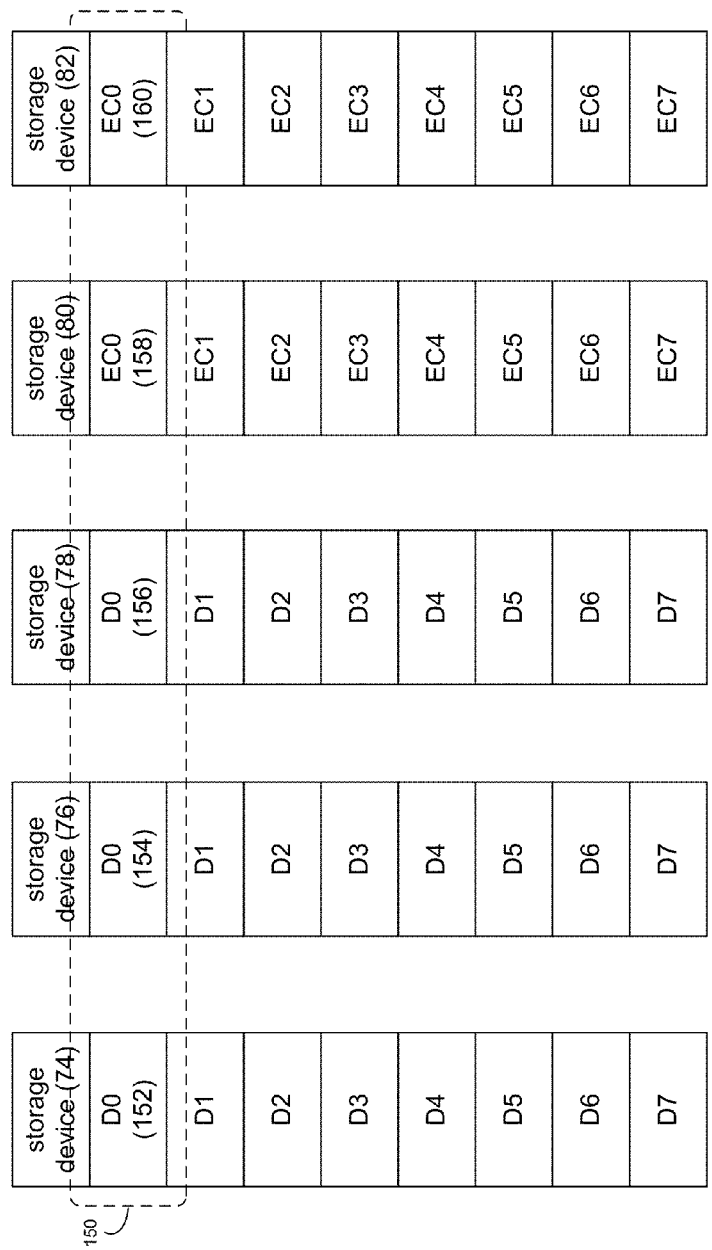
FIG. 4 is a diagrammatic view of various storage devices.

Referring also to FIGS. 3 & 4 and as will be discussed below in greater detail, data caching process 10 may define 100 a data stripe (e.g., data stripe 150) that spans one or more of N data storage devices (e.g., data storage devices 74, 76, 78) and one or more of M erasure code devices (e.g., erasure code devices 80, 82). Data caching process 10 may receive 102 a data chunk (e.g., data chunk 86) to be written to data storage system 84 (e.g., the combination of storage devices 74, 76, 78, 80, 82). Data caching process 10 may write 104 at least a portion of data chunk 86 to the portion of data stripe 150 that spans the one or more N data storage devices (e.g., data storage devices 74, 76, 78).

The instruction sets and subroutines of data caching process 10 may be stored on one or more storage devices included within data caching system 12. For example, the instruction sets and subroutines of data caching process 10 may be stored on one or more of: storage device 74 coupled to server computer 50; storage device 76 coupled to server computer 52; storage device 78 coupled to server computer 54; storage device 80 coupled to server computer 56; and storage device 82 coupled to server computer 58. Accordingly, the instruction sets and subroutines of data caching process 10 may be distributed amongst the various devices included within data caching system 12.

The instruction sets and subroutines of data caching process 10 may be executed by one or more processors (not shown) and one or more memory architectures (not shown) incorporated into one or more of: server computer 50; server computer 52; server computer 54; server computer 56; and server computer 58. Accordingly, execution of the instruction sets and subroutines of data caching process 10 may be distributed amongst the various devices included within data caching system 12.

Users 16, 18, 20 may store and/or retrieve various data portions (not shown) from the various devices (e.g., server computers 50, 52, 54, 56, 58) included within data caching system 12 using client electronic devices 22, 24, 26 (respectively). Examples of client electronic devices 22, 24, 26 may include, but are not limited to, personal computer 22, laptop computer 24, personal digital assistant 26, a server computer (not shown), a notebook computer (not shown), a data-enabled, cellular telephone (not shown), and a dedicated network device (not shown). Client electronic devices 22, 24, 26 may each execute an operating system, examples of which may include but are not limited to Microsoft Windows™, Microsoft Windows CE™, Redhat Linux™, or a custom operating system.

The various client electronic devices may be directly or indirectly coupled to network 14. For example, personal computer 22 and laptop computer 24 are shown directly coupled to network 14 via a hardwired network connection. Further, personal digital assistant 26 is shown wirelessly coupled to network 14 via wireless communication channel 28 established between personal digital assistant 26 and wireless access point (i.e., WAP) 30, which is shown directly coupled to network 14. WAP 30 may be, for example, an IEEE 802.11a, 802.11b, 802.11g, 802.11n, Wi-Fi, and/or Bluetooth device that is capable of establishing wireless communication channel 28 between personal digital assistant 26 and WAP 30.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Data Caching Process:

For illustrative purposes, assume that server computers 50, 52, 54, 56, 58 are within a corporate infrastructure and that users 16, 18, 20 are corporate users that use client electronic devices 22, 24, 26 to access (i.e., store and retrieve) data on storage area network 60. As discussed above and for illustrative purposes, assume that server computers 50, 52, 54, 56, 58 are configured to work as a caching tier. While in this particular example, data caching system 12 is shown to include five server computers (e.g., server computers 50, 52, 54, 56, 58), this is for illustrative purposes only and is not intended to be a limitation of this disclosure, as other configurations are possible. For example, the number of server computers included within data caching system 12 may be increased/decreased depending upon various design criteria and considerations.

As stated above, data caching process 10 may define 100 a data stripe (e.g., data stripe 150) that spans one or more of N data storage devices (e.g., data storage devices 74, 76, 78) and one or more of M erasure code devices (e.g., erasure code devices 80, 82). Data caching process 10 may receive 102 a data chunk (e.g., data chunk 86) to be written to data storage system 84 (e.g., the combination of storage devices 74, 76, 78, 80, 82). Data caching process 10 may write 104 at least a portion of data chunk 86 to the portion of data stripe 150 that spans the one or more N data storage devices (e.g., data storage devices 74, 76, 78). In this particular example, data chunk 86 is intended to represent generic data to be written to data caching system 12. Accordingly, all or a portion of data chunk 86 may originate from user 16, user 18 and/or user 20.

When defining 100 a data stripe (e.g., data stripe 150) that spans one or more of N data storage devices (e.g., data storage devices 74, 76, 78) and one or more of M erasure code devices (e.g., erasure code devices 80, 82), the size of the stripe may be defined. Data stripe 150 may include a plurality of data elements. For example, a data stripe that spans five physical devices may include five data elements. Specifically and for illustrative purposes only, data stripe 150 that spans five storage devices (namely e.g., data storage devices 74, 76, 78, 80, 82) is shown to include five elements (namely data elements 152, 154, 156 and erasure code elements 158, 160). When defining the size of a data stripe, the size of the elements that make up the data stripe may also be defined. For example, if a data stripe includes 1.0 kilobyte data elements, each data stripe (in this particular example) may hold 300 kilobytes of data (via the combination of data elements 152, 154, 156) in conjunction with 200 kilobytes of erasure code (via the combination of erasure code elements 158, 160).

The manner in which the data (e.g., all or a portion of data chunk 86) is written to data storage system 84 generally and data stripe 150 specifically may vary depending on the manner in which data caching process 10 is configured. For example, assume for illustrative purposes that data chunk 86 (which is one kilobyte in size) is received by server computer 50 and that all elements (e.g., both data elements 152, 154, 156 and erasure code elements 158, 160) are one kilobyte in size.

Data caching process 10 may be configured to evenly distribute data chunk 86 across all storage devices/data elements included within data stripe 150, regardless of the specific server computer receiving the data chunk (thus spanning all of the N data storage devices). Accordingly, writing 104 at least a portion of data chunk 86 to the portion of data stripe 150 that spans the one or more N data storage devices may include writing 106 at least a portion of data chunk 86 to the portion of the data stripe that spans all of the N data storage devices (e.g., data storage devices 74, 76, 78). In this particular example, one third of a kilobyte of data chunk 86 may be written to each of data elements 152, 154, 156.

Alternatively, data caching process 10 may be configured to write data chunk 86 to only the storage device/data element included within the server computer receiving the data chunk. In this particular example, server computer 50 received data chunk 86. Accordingly, the entire kilobyte of data chunk 86 may be written to data element 152 of data stripe 150 (thus spanning only one of the N data storage devices). Accordingly, writing 104 at least a portion of data chunk 86 to the portion of data stripe 150 that spans the one or more N data storage devices may include writing 108 at least a portion of data chunk 86 to the portion of the data stripe that spans one of the N data storage devices (e.g., data storage devices 74). In this particular example, the entire kilobyte of data chunk 86 may be written to data elements 152 and no data may be written to data elements 154, 156.

In the event that data chunk 86 is larger in size than the capacity of data stripe 150, a larger data stripe may be defined 100 by data caching process 10. For example, the size of the data stripes may be dynamic and based upon the size of the data chunk received 102 by data caching process 10. Accordingly, in the event that a 3.0 kilobyte data chunk is received, a data stripe having the appropriately sized data elements may be defined 100.

For example, if data caching process 10 was configured to evenly distribute data chunk 86 across all storage devices/data elements included within data stripe 150 regardless of the specific server computer receiving the data chunk (thus spanning all of the N data storage devices), a data stripe having three 1.0 kilobyte data elements would be required to accommodate the 3.0 kilobyte data chunk received.

Alternatively, if data caching process 10 was configured to write data chunk 86 to only the storage device/data element included within the server computer receiving the data chunk, a data stripe having three 3.0 kilobyte data elements would be required to accommodate the 3.0 kilobyte data chunk received.

Alternatively, in the event that data chunk 86 is larger in size than the capacity of data stripe 150, when defining 100 a data stripe that spans one or more of the N data storage devices and one or more of the M erasure code devices, data caching process 10 may define 110 a plurality of data stripes (that each span one or more of the N data storage devices and one or more of the M erasure code devices), thus allowing the larger data chunk to be distributed across the plurality of data stripes.

Accordingly and continuing with the above-state example in which a 3.0 kilobyte data chunk is received, if data caching process 10 was configured to evenly distribute data chunk 86 across all storage devices/data elements included within data stripe 150 regardless of the specific server computer receiving the data chunk (thus spanning all of the N data storage devices), a data stripe having three 1.0 kilobyte data elements would accommodate the 3.0 kilobytes data chunk received. However, in the event that a size of the data chunk received would not fit within the data stripe even if data caching process 10 was configured to the distribute data chunk 86 across all storage devices/data elements included within data stripe 150, a plurality of data stripes may need to be defined 110.

Further, if data caching process 10 was configured to write data chunk 86 to only the storage device/data element included within the server computer receiving the data chunk, three data stripes (each having 1.0 kilobyte data elements) would be needed to accommodate the 3.0 kilobyte data chunk received. Accordingly, when writing 104 at least a portion of the data chunk to the portion of the data stripe that spans the one or more N data storage devices, data caching process 10 may write 112 at least a portion of the data chunk to the portion of each of the plurality of data stripes that spans the one or more N data storage devices.

Data caching process 10 may generate 114 erasure code data (e.g., EC0 within storage device 80 and EC0 within storage device 82) based, at least in part, upon the data chunk (e.g., data chunk 86) to be written to data storage system 84. Accordingly, at least a portion of the erasure code data may be written to the portion of data stripe 150 that spans the one or more M erasure code devices. Specifically and in this example, data caching process 10 may generate 114 the erasure code data based, at least in part, upon the various data portions (e.g., D0 within storage device 74, D0 within storage device 76, and D0 within storage device 78) included within data stripe 150. Examples of such erasure code data may include but are not limited to parity data and LDPC data.

Such erasure code data may be calculated using one of many known methodologies. For example, when generating 114 erasure code data (e.g., EC0 within storage device 80 and/or EC0 within storage device 82), data caching process 10 may exclusive-or (XOR) D0 within storage device 74 with D0 within storage device 76. The result of this exclusive-or process may be exclusive-or'd with D0 within storage device 78 to generate EC0 within storage device 80 and/or EC0 within storage device 82.

This erasure code data may be maintained on (e.g., storage device 80 and/or storage device 82) until one or more of D0 within storage device 74, D0 within storage device 76, and D0 within storage device 78 are overwritten with newer data, at which point the erasure code data would be regenerated 114 by data caching process 10 and updated erasure code data would be written to e.g., storage device 80 and/or storage device 82.

Assume for illustrative purposes that the value of D0 within storage device 74 changes and is overwritten with newer data. Accordingly, the value of the appropriate erasure code data would need to be regenerated 114 and written to storage device 80 and/or storage device 82. For example, when regenerating 114 the erasure code data, the old value of D0 within storage device 74 may be exclusive-or'd with the current value of the erasure code data to extract out the old value of D0 within storage device 74. The resulting parity value may be exclusive-or'd with the new value of D0 within storage device 74 to generate 114 updated erasure code data, which may be written to the appropriate storage device (e.g., storage device 80 and/or storage device 82).

As an alternative way of generating 114 updated erasure code data, the new value of D0 within storage device 74 may be exclusive-or'd with the old value of D0 within storage device 74, and the result of this process may be exclusive-or'd with the old value of the erasure code data to generate 114 updated erasure code data, which may be written to the appropriate storage device (e.g., storage device 80 and/or storage device 82).

As is known in the art, in the event of a device failure and/or a data read error that e.g., renders D0 within storage device 74 inaccessible, the inaccessible data (e.g., D0 within storage device 74) may be recovered using the accessible data portions (e.g., D0 within storage device 76 and D0 within storage device 78) in combination with the erasure code data (e.g., EC0 within storage device 80 and/or EC0 within storage device 82).

While data caching system 12 is described above as immediately writing data chunk 86 to data storage system 84, this is for illustrative purposes only and is not intended to be a limitation of this disclosure, as other configurations are possible and are considered to be within the scope of this disclosure. For example, data caching process 10 may temporarily store 116 all or a portion of data chunk 86 (in a high-availability fashion) until e.g., a complete data stripe is ready to be written to data storage system 84. For example, each storage device (namely e.g., data storage devices 74, 76, 78, 80, 82) included within storage system 84 may include multiple discrete storage devices (e.g., capable of mirroring data). Accordingly, upon receiving data chunk 86 on server computer 50, data caching process 10 may mirror data chunk 86 within e.g., storage device 74, thus temporarily storing 116 data chunk 86 in a high-availability fashion until e.g., data stripe 150 is complete and ready to be written to data storage system 84.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A data caching system comprising:
    a data storage system including:
       N data storage devices, and
       M erasure code devices;
    at least one processor;
    at least one memory architecture coupled with the at least one processor;
    a first software module executed on the at least one processor and the at least one memory architecture, wherein the first software module is configured to perform operations including defining a data stripe that spans one or more of the N data storage devices and one or more of the M erasure code devices, including defining a plurality of data stripes that each span one or more of the N data storage devices and one or more of the M erasure code devices;
    a second software module executed on the at least one processor and the at least one memory architecture, wherein the second software module is configured to perform operations including receiving a data chunk to be written to the data storage system, wherein the data chunk received is larger in size than the capacity of the data stripe; and
    a third software module executed on the at least one processor and the at least one memory architecture, wherein the third software module is configured to perform operations including writing at least a portion of the data chunk to the portion of the data stripe that spans the one or more N data storage devices, including writing at least a portion of the data chunk to the portion of each of the plurality of data stripes that spans the one or more N data storage devices;
    wherein each of the N data storage devices and the M erasure code devices is included within a unique server computer.

2. The data caching system of claim 1 wherein the data stripe spans all of the N data storage devices, and wherein writing at least a portion of the data chunk to the portion of the data stripe that spans the one or more N data storage devices includes:
    writing at least a portion of the data chunk to the portion of the data stripe that spans all of the N data storage devices.

3. The data caching system of claim 1 wherein the data stripe spans one of the N data storage devices, and wherein writing at least a portion of the data chunk to the portion of the data stripe that spans the one or more N data storage devices includes:
    writing at least a portion of the data chunk to the portion of the data stripe that spans one of the N data storage devices.

4. The data caching system of claim 1 further comprising:
    a fourth software module executed on the at least one processor and the at least one memory architecture, wherein the fourth software module is configured to perform operations including:
       generating erasure code data based, at least in part, upon the data chunk to be written to the data storage system, and
       writing at least a portion of the erasure code data to the portion of the data stripe that spans the one or more M erasure code devices.

5. The data caching system of claim 4 wherein the erasure code data includes parity data.

6. The data caching system of claim 1 further comprising a fifth software module executed on the at least one processor and the at least one memory architecture, wherein the fifth software module is configured to perform operations including:
    temporarily storing at least a portion of the data chunk in a high availability fashion prior to writing at least a portion of the data chunk to the portion of the data stripe that spans the one or more N data storage devices.

7. A computer program product residing on a non-transitory computer readable medium having a plurality of instructions stored thereon that, when executed by a processor, cause the processor to perform operations comprising:
    defining a data stripe that spans one or more of N data storage devices and one or more of M erasure code devices, including defining a plurality of data stripes that each span one or more of the N data storage devices and one or more of the M erasure code devices, wherein the one or more N data storage devices and the one or more M erasure code devices are included within a data storage system;
    receiving a data chunk to be written to the data storage system, wherein the data chunk received is larger in size than the capacity of the data stripe; and
    writing at least a portion of the data chunk to the portion of the data stripe that spans the one or more N data storage devices, including writing at least a portion of the data chunk to the portion of each of the plurality of data stripes that spans the one or more N data storage devices;
    wherein each of the N data storage devices and the M erasure code devices is included within a unique server computer.

8. The computer program product of claim 7 wherein the data stripe spans all of the N data storage devices, and wherein the instructions for writing at least a portion of the data chunk to the portion of the data stripe that spans the one or more N data storage devices include instructions for:
    writing at least a portion of the data chunk to the portion of the data stripe that spans all of the N data storage devices.

9. The computer program product of claim 7 wherein the data stripe spans one of the N data storage devices, and wherein the instructions for writing at least a portion of the data chunk to the portion of the data stripe that spans the one or more N data storage devices include instructions for:
    writing at least a portion of the data chunk to the portion of the data stripe that spans one of the N data storage devices.

10. The computer program product of claim 7 further comprising instructions for:
    generating erasure code data based, at least in part, upon the data chunk to be written to the data storage system, and
    writing at least a portion of the erasure code data to the portion of the data stripe that spans the one or more M erasure code devices.

11. The computer program product of claim 10 wherein the erasure code data includes parity data.

12. The computer program product of claim 7 further comprising instructions for:
- temporarily storing at least a portion of the data chunk in a high availability fashion prior to writing at least a portion of the data chunk to the portion of the data stripe that spans the one or more N data storage devices.

13. A computer-implemented method comprising:
- defining a data stripe that spans one or more of N data storage devices and one or more of M erasure code devices, including defining a plurality of data stripes that each span one or more of the N data storage devices and one or more of the M erasure code devices, wherein the one or more N data storage devices and the one or more M erasure code devices are included within a data storage system;
- receiving a data chunk to be written to the data storage system, wherein the data chunk received is larger in size than the capacity of the data stripe; and
- writing at least a portion of the data chunk to the portion of the data stripe that spans the one or more N data storage devices, including writing at least a portion of the data chunk to the portion of each of the plurality of data stripes that spans the one or more N data storage devices;
- wherein each of the N data storage devices and the M erasure code devices is included within a unique server computer.

14. The computer-implemented method of claim 13 wherein the data stripe spans all of the N data storage devices, and wherein writing at least a portion of the data chunk to the portion of the data stripe that spans the one or more N data storage devices includes:
- writing at least a portion of the data chunk to the portion of the data stripe that spans all of the N data storage devices.

15. The computer-implemented method of claim 13 wherein the data stripe spans one of the N data storage devices, and wherein writing at least a portion of the data chunk to the portion of the data stripe that spans the one or more N data storage devices includes:
- writing at least a portion of the data chunk to the portion of the data stripe that spans one of the N data storage devices.

16. The computer-implemented method of claim 13 further comprising:
- generating erasure code data based, at least in part, upon the data chunk to be written to the data storage system, and
- writing at least a portion of the erasure code data to the portion of the data stripe that spans the one or more M erasure code devices.

17. The computer-implemented method of claim 16 wherein the erasure code data includes parity data.

18. The computer-implemented method of claim 13 further comprising: temporarily storing at least a portion of the data chunk in a high availability fashion prior to writing at least a portion of the data chunk to the portion of the data stripe that spans the one or more N data storage devices.

\* \* \* \* \*